Oct. 24, 1950     F. N. JOHNSON ET AL     2,526,754

PIPE COUPLING

Filed Feb. 3, 1948

INVENTORS.
FRED N. JOHNSON
AND HAROLD D. AULT.
Allen v Allen
ATTORNEYS

Patented Oct. 24, 1950

2,526,754

UNITED STATES PATENT OFFICE 2,526,754

PIPE COUPLING

Fred N. Johnson, Portland, Oreg., and Harold D. Ault, Walla Walla, Wash., assignors to Armco Steel Corporation, a corporation of Ohio Application February 3, 1948, Serial No. 6,068

4 Claims. (Cl. 285—172)

This invention relates to pipe couplings and more particularly to couplings for irrigation pipe.

Irrigation pipe, in order to be commercially saleable, must conform to certain requirements. The lengths of pipe between couplings must be such that they can be handled by one man. It is highly desirable that the couplings be such that two pipes may be engaged and latched, as well as unlatched and disengaged, by a single operator holding the pipe at or near its midpoint. The latching arrangement must be such that the pipe in its latched condition is held against rotation. This is important because of the fact that risers are provided at frequent intervals and these risers must be held in upright condition. Because of their weight they have a tendency to twist one section of the pipe in relation to an adjacent section and if the coupling is of the type which is engaged or disengaged by twisting one section with respect to another, disengagement of the coupling would be likely to result. It is also important that the coupling be of such character that adjacent sections of pipe do not have to be in coaxial or latched position, so that the irrigation pipe may follow the contours of the land on which it is laid.

In the light of the above brief discussion it is an object of the invention to provide a pipe coupling by means of which two adjacent sections of pipe may be coupled against rotation. It is another object of the invention to provide an arangement whereby coupling and uncoupling may be effected from a remote position, as for example, by an operator holding a section of pipe at about its midpoint. It is a further object of the invention to provide a coupling as above outlined which will be simple and effective and not likely to get out of order.

These and other objects of the invention which will be described in more detail hereinafter, or which will suggest themselves to those skilled in the art upon reading these specifications, are accomplished by that certain construction and arrangement of parts of which the following is a detailed description of an exemplary embodiment.

Reference is made to the drawings forming a part hereof, and in which Figure 1 is a plan view of two adjacent sections of pipe provided with a coupling according to the invention.

Figure 1:
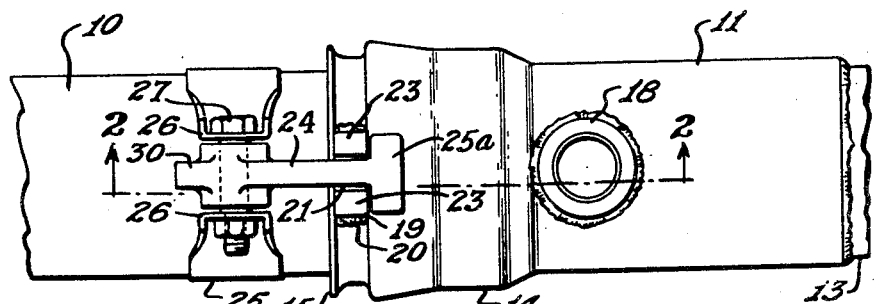

Briefly in the practice of the invention, each section of pipe is provided with a male end and a female end, the female end being belled and provided with a gasket adjacent its end and annularly thereof. The male end of one section is seated in the belled portion of an adjacent section in annular contact with the gasket and in the latch-engaged position the male end is capable of a slight amount of further movement into the belled portion. One of the adjacent coupled sections is provided with a vertically swingable latch member and the other with a keeper. The latch member and keeper have cooperating cam surfaces whereby when the adjacent ends of the pipe are thrust together the latch member is raised to permit the passage of the keeper and then drops into latching engagement behind the keeper. The latch member has a further cam surface whereby upon further movement together of the adjacent pipe ends the latch member is again raised out of disengagement with the keeper so that upon slight relative rotation of the pipes the latch member is prevented from again engaging behind the keeper and one pipe section may be withdrawn from the other.

Refering now more particularly to the drawings, two adjacent pipe sections are shown at 10 and 11, the member 10 being the male member and the member 11 being the female member. It will be understood that the end of the member 10, which is not shown, will be configured like the member 11, and the end of the member 11, which is not shown, will be configured like the member 10.

As shown in the drawings, the member 11 is secured as by welding at 12 to the end of the adjacent pipe 13, although if desired the end of the pipe 13 could be configured like the member 11.

The member 11 is belled as at 14 and may be provided with the flared opening 15 to facilitate entry of the member 10. Internally the belled portion is provided with a gasket member 16 which, as shown, may be of generally U-shaped cross-section, and having a longer portion 17 which engages the pipe 10. It will be understood that water pressure in the space between the bell 14 and the pipe 10 bears against the outside of the gasket portion 17 sealing it tight against the pipe 10.

A fitting for a riser of conventional form is indicated at 18.

A keeper element 19 is secured to the end of the belled portion as by welding at 20. This keeper is provided with a rectangular notch 21, and at the sides of the notch 21 are the latching abutments 22 which have the cam surfaces 23.

The member 10 is provided with a latch member indicated generally at 24. As shown a strap 25 may be provided around the member 10 and having the outstanding ears 26 and a bolt 27 may serve as the pintle for the latch member 24. The latch member 24 has a T-shaped end indicated generally at 25—a, the T portion being of an extent to engage behind the abutments 22, with the portion 24 passing through the notch 21. The T portion 25a is provided with the cam surface 26 which is engageable with the cam faces 23 on the keeper.

Figure 2:
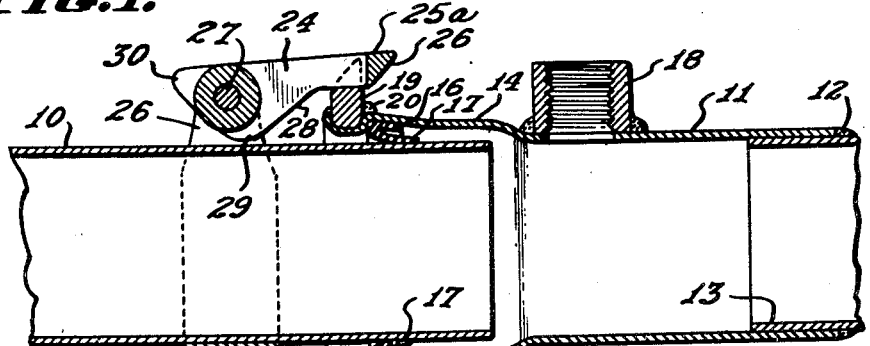
Figure 2 is a cross-sectional view of the same on line 2—2.

Thus in coupling the two sections of pipe together the members 10 and 15 are brought into engagement and as the member 10 is pushed into the belled portion 14, cooperation between cam faces 26 and 23 causes the latch member 24 to pivot about the bolt or pintle 27 until the condition of Figure 2 is reached, where the latch member 24 is in latching position with the T portion 25—a engaged behind abutments 22.

Figure 3:
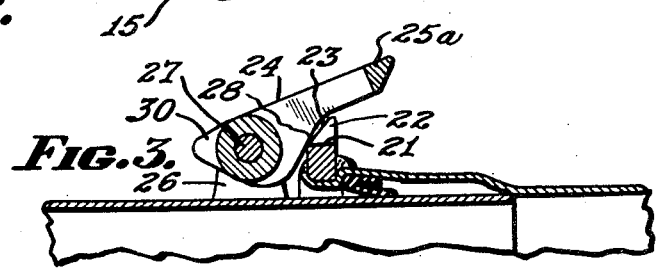
Figure 3 is a fragmentary view similar to Figure 2, showing a position during the uncoupling operation.

In this condition it will be noted that the end of the pipe 10 is not bottomed in the belled portion 14, but is capable of still further inward movement for unlatching as will now be described. The latch member 24 is provided with the additional cam surface 28 engageable by the forward bottom edge of the notch 21. When the two pipes are thrust together still further, as shown in Figure 3, engagement of the cam surface 28 with the front bottom edge of the notch 21 again raises the latch member 24, disengaging the T portion 25—a from behind the abutments 22, in which condition one pipe may be rotated a small amount in relation to the other to prevent the latch member 24 from falling into latching position upon withdrawal of one pipe from the other.

Figure 4:
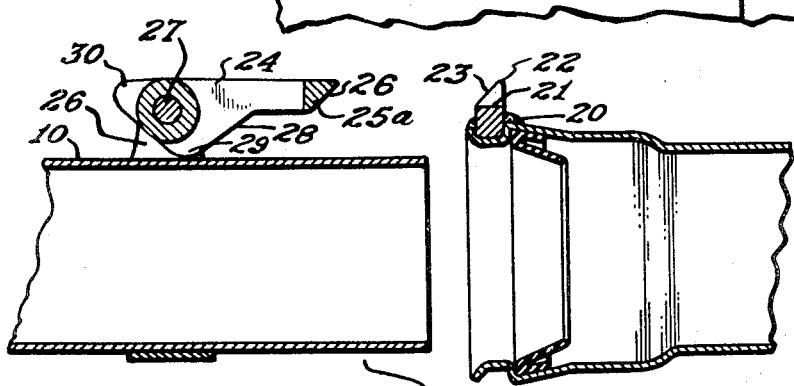
Figure 4 is a view similar to Figure 2 showing two adjacent sections of pipe about to be coupled.

As best seen in Figure 4, the latch member 24 is provided with a stop element 29 which holds the latch member 24 in position for engagement of the cam faces 26 and 23 when the pipes are uncoupled. The stop member 29 rests against the pipe 10 when the pipes are uncoupled.

There is also provided the stop member 30 which prevents the latch member 24 from falling over backwards. Thus the movement of the latch member 24 is limited to about 90° of arc.

From the foregoing description it may be seen that there is provided a coupling which may be latched and unlatched without manipulation of the latching means by an operator. The operator may hold either the pipe 10 or the pipe 13 at substantially its midpoint and he may latch the pipes together from that position. He may also unlatch them by a simple thrusting motion followed by a slight twisting motion.

It will be clear that modifications may be made without departing from the spirit of the invention, and that no limitations are intended other than those set forth in the claims which follow.

What is claimed as new and is desired to be secured by Letters Patent is:

1. A latching organization for two sections of irrigation pipe, comprising a pivoted latch member on one of said sections and a keeper on the other, said latch member and said keeper having cooperating cam faces serving to raise said latch member when said sections are pushed together, said latch member then engaging behind said keeper, said latch member having an additional cam surface cooperating with said keeper when said sections are pushed still further together to raise said latch member for unlatching said sections, said keeper being provided with a substantially rectangular notch, and said latch member being substantially T-shaped, said T in latching engagement lying in said notch with the cross portion thereof engaging behind said keeper.

2. An organization according to claim 1, in which the portions of said keeper to each side of said notch, and the cross portion of said T, are provided with cooperating cam surfaces.

3. An organization according to claim 2, in which the upright portion of said T is provided with a downwardly sloping cam surface on its underside.

4. An organization according to claim 3 in which said last mentioned cam surface terminates in a stop element arranged to abut the section to which said latch member is pivoted to held said latch member in position for engagement with said keeper.

FRED N. JOHNSON.
HAROLD D. AULT.

REFERENCES CITED

The following references are of record in the file of this patent:

UNITED STATES PATENTS

| Number | Name | Date |
| --- | --- | --- |
| 975,138 | Lancaster | Nov. 8, 1910 |
| 1,284,358 | Kelley | Nov. 12, 1918 |
| 2,187,119 | Fish | Jan. 16, 1940 |
| 2,253,232 | Gheen | Aug. 19, 1941 |
| 2,473,283 | Guenthner | June 14, 1949 |